(12) United States Patent
Peltola

(10) Patent No.: US 7,315,525 B2
(45) Date of Patent: Jan. 1, 2008

(54) CHANGE OF FREQUENCY RANGE IN A COMMUNICATIONS SYSTEM

(75) Inventor: Jukka Peltola, Oulu (FI)

(73) Assignee: Nokia Corporation, Espoo (FI)

( * ) Notice: Subject to any disclaimer, the term of this patent is extended or adjusted under 35 U.S.C. 154(b) by 1018 days.

(21) Appl. No.: 10/168,601

(22) PCT Filed: Dec. 15, 2000

(86) PCT No.: PCT/FI00/01101

§ 371 (c)(1),
(2), (4) Date: Sep. 16, 2002

(87) PCT Pub. No.: WO01/47302

PCT Pub. Date: Jun. 28, 2001

(65) Prior Publication Data

US 2003/0091006 A1    May 15, 2003

(30) Foreign Application Priority Data

Dec. 20, 1999  (FI) ................................. 19992729

(51) Int. Cl.
*H04Q 7/00* (2006.01)
*H04Q 7/20* (2006.01)
*H04J 1/00* (2006.01)

(52) U.S. Cl. ................. 370/328; 370/343; 455/436

(58) Field of Classification Search ............... 370/252, 370/331, 332, 343, 480, 340, 341; 455/436–439
See application file for complete search history.

(56) References Cited

U.S. PATENT DOCUMENTS

| | | | |
|---|---|---|---|
| 5,574,973 A | 11/1996 | Borth et al. | |
| 5,697,055 A * | 12/1997 | Gilhousen et al. | 455/436 |
| 5,898,682 A | 4/1999 | Kanai | |
| 5,999,814 A | 12/1999 | Cuffaro et al. | |
| 6,023,611 A * | 2/2000 | Bolin et al. | 455/114.1 |
| 6,216,009 B1 * | 4/2001 | Barnett | 455/510 |
| 6,546,252 B1 * | 4/2003 | Jetzek et al. | 455/437 |
| 6,590,879 B1 * | 7/2003 | Huang et al. | 370/331 |
| 6,654,362 B1 * | 11/2003 | Palamara | 370/332 |
| 6,667,961 B1 * | 12/2003 | Park et al. | 370/331 |
| 7,009,953 B2 * | 3/2006 | Tiedemann, Jr. | 370/332 |

FOREIGN PATENT DOCUMENTS

| | | |
|---|---|---|
| EP | 0948231 | 10/1999 |
| WO | 9801000 | 1/1998 |
| WO | 9905873 | 2/1999 |

\* cited by examiner

*Primary Examiner*—Wing Chan
*Assistant Examiner*—Hong Sol Cho

(57) ABSTRACT

The object of the invention is a method for changing the frequency band used by a mobile station in a mobile station system. The invention is based on the idea that instead of using a fixed threshold value to change the frequency band, it is replaced with a variable threshold value in connection of a failed attempt to change the frequency band. The variable threshold value is based on the signal levels measured on both frequency bands and used to obtain the new threshold value. A fresh attempt to change the frequency band is made applying the new threshold value.

21 Claims, 3 Drawing Sheets

CHANGE OF FREQUENCY RANGE IN A COMMUNICATIONS SYSTEM

FIELD OF THE INVENTION

The subject of this invention is the change of the radio channel used by a transfer connection from one frequency band to another in a telecommunication system, particularly in a mobile telephone system using at least two frequency bands.

BACKGROUND

Dual-band mobile stations entered the market when single-band mobile station systems could no longer respond to the growth of mobile telephony traffic. The dual-band system consists of two networks, operated at different frequency ranges and capable of handling traffic between mobile stations and base transceiver stations. A dual-band mobile station can receive and transmit messages on both frequency bands. The choice of frequency band depends on the traffic loading and reception capabilities of each band.

A typical dual-band system will use the 900-MHz GSM network frequency for one band and the 1800-MHz frequency for the other. The 1800-MHz network is usually called DCS (Digital Cellular System); it is also called GSM-1800, but in this context the term DCS will be used. The use of two frequency bands will make possible an increase in mobile station customers when compared to a single-band system. As the GSM network is on its own no longer capable of meeting the requirements of all customers, the operators have started favouring the 1,800-MHz band by transferring mobile station calls there from the GSM frequency band.

In practice, operators try to transfer calls from GSM to DCS whenever possible, even when the GSM signal level is sufficient for transmitting the call. The measured information used for allocating the channel is received through the BCCH (Broadcast Control Channel). There are systems with a BCCH on both the DCS and GSM frequencies, but systems also exist with a BCCH on one frequency range only. The subject of the invention is specifically such systems with one BCCH, particularly dual-band networks that do not have the measured information of the BCCH available for channel allocation on the DCS side.

Single BCCH systems use fixed threshold values based on average measurements. However, the use of average values does not provide correct information on the actual signal levels of the DCS band channels. Theoretically, the difference between the GSM and DCS signal levels is 6 dB. However, the operator can select the default signal level difference for the network, because the practical difference may vary depending on the network structure and environmental conditions.

Let us study an example of frequency band limits as illustrated in FIG. 1. If the (lower) limit of signal level on the GSM band for changing the frequency band is −80 dBm, the DCS signal level must, when using the theoretical, fixed threshold value, be −86 dBm or better for the call to be continued. The GSM band signal levels on which a transfer to DCS will be effected have been marked with diagonal lines on the figure. It can be seen that if the GSM signal level is below the −80 dBm limit, no attempt will be made to transfer the connection to the DCS side, as changing the frequency band in this case would, most likely, merely lower the call quality. The shaded area of the figure is the area where the DCS network will accept the signal level.

Let us assume a situation where we want to transfer the call from GSM to DCS (1A). If, however, the signal level on the DCS band is not sufficient for maintaining the connection, the network will attempt to transfer it back to the GSM band (1B). If the signal level is still above the threshold value for the GSM band, a further attempt will be made to move the call to the DCS band (2A), and so on . . . . We have a situation where the frequency band is being unnecessarily changed back and forth, resulting in deteriorating call quality and even in losing the connection. To prevent such problems, a well-known technique is to use a timer that delays the next possible change of frequency band. However, the problem with the timer is the difficulty in setting a suitable delay. If the delay is too long, frequency changes will take too long to execute, increasing the loading on network resources. If, on the other hand, the delay is too short, there is a risk of too frequent frequency band changes. The objective of the invention is to eliminate these drawbacks.

SUMMARY OF THE INVENTION

According to a first aspect of the present invention, a method for changing the radio frequency used by a mobile station in a mobile station system including at least one mobile station and a fixed network, connected to each other via a radio route, which radio route uses at least two frequency bands for transmitting information between the mobile station and the fixed network, in which method the strength of the signal received by the mobile station on the first frequency band is measured, the information concerning the measured signal strength is sent to the fixed network, the signal strength measured on the first frequency band is compared with the predetermined threshold value of the first frequency band, and the frequency band is changed when necessary, as a result of the change the strength of the signal received by the mobile station on the second frequency band is measured, the information concerning the measured signal strength is sent to the fixed network, the signal strength measured on the second frequency band is compared with the predetermined threshold value of the second frequency band, and the frequency is changed back to the first band, when necessary, wherein as a result of the return to the first frequency band, the threshold value of the first frequency band is changed, and the changed threshold value is then used for comparison with the measured signal strength of the first frequency band.

According to a second aspect of the present invention, an arrangement for changing the frequency band used by a mobile station in a mobile station system including at least one mobile station and a fixed network, connected to each other via a radio route, which radio route uses at least two frequency bands for transmitting information between the mobile station and the fixed network, which fixed network includes comparison instruments for comparing the signal strength of the frequency band currently in use with a predetermined threshold value, specific to each frequency band, and instruments, responsive to the comparison instruments, for changing the frequency band on the radio route between the mobile station and the fixed network, characterized in that the fixed network includes the threshold value determining instruments for changing at least one band-specific threshold value.

The invention is based on the idea of replacing the use of a fixed threshold value for changing the frequency band value in connection of an unsuccessful change of band for the use of a variable threshold value. The variable threshold value is based on signal levels measured on both frequency bands. A fresh attempt to change the frequency band is made using the new threshold value. If even the new attempt fails, the system will replace the threshold value again.

These and other objects, features and advantages of the present invention will become more apparent in light of the detailed description of a best mode embodiment thereof, as illustrated in the accompanying drawing.

BRIEF DESCRIPTION OF THE DRAWINGS

Below, the invention is described in more detail with reference to the examples in FIGS. 2-4 shown in the attached drawings where.

DETAILED DESCRIPTION OF THE INVENTION

The invention relates to calls/mobile station customers that the operator has, based on certain criteria, chosen to transfer from the GSM frequency band to the DCS frequency band in a single BCCH system. These criteria are not relevant from the point of the invention, which merely concentrates on the change of frequency band for the chosen call/mobile station customer, and more specifically on the repeated attempt to change when the first attempt has failed.

Figure 2:
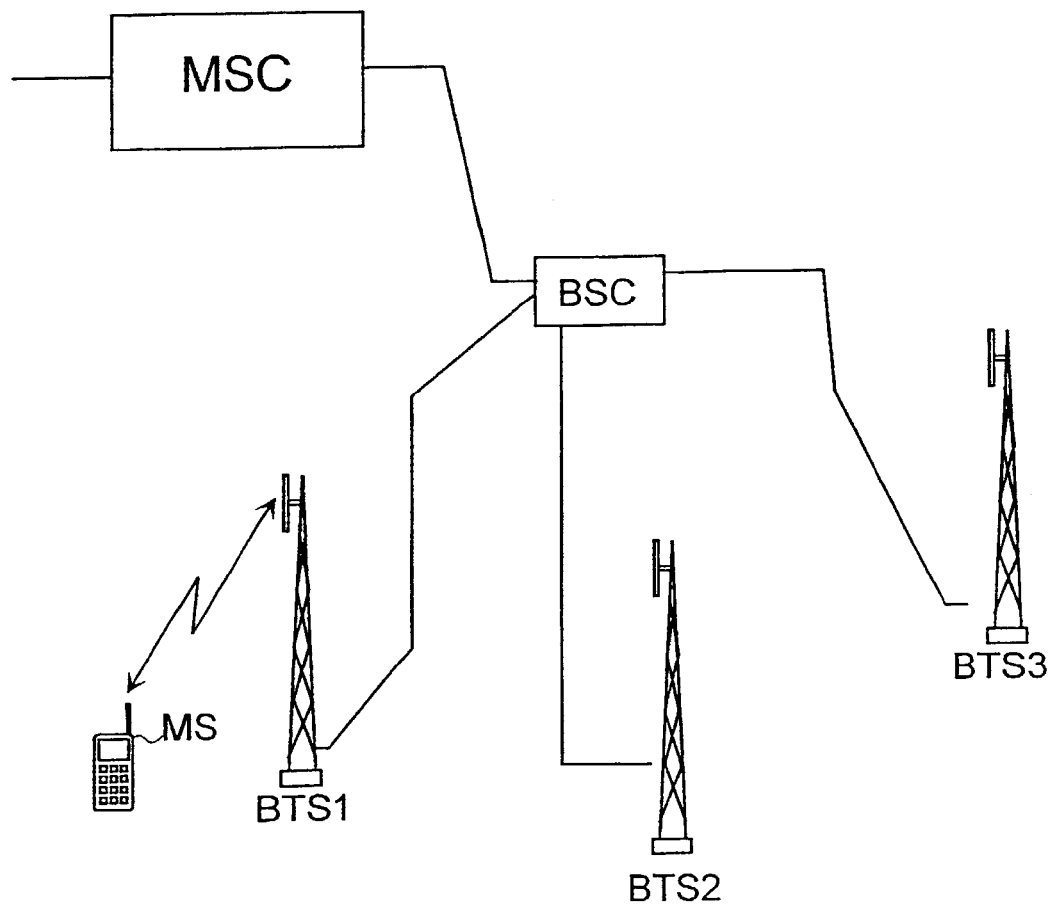
FIG. 2 illustrates the part of the telecommunication network where the invention operates.
Figure 3:
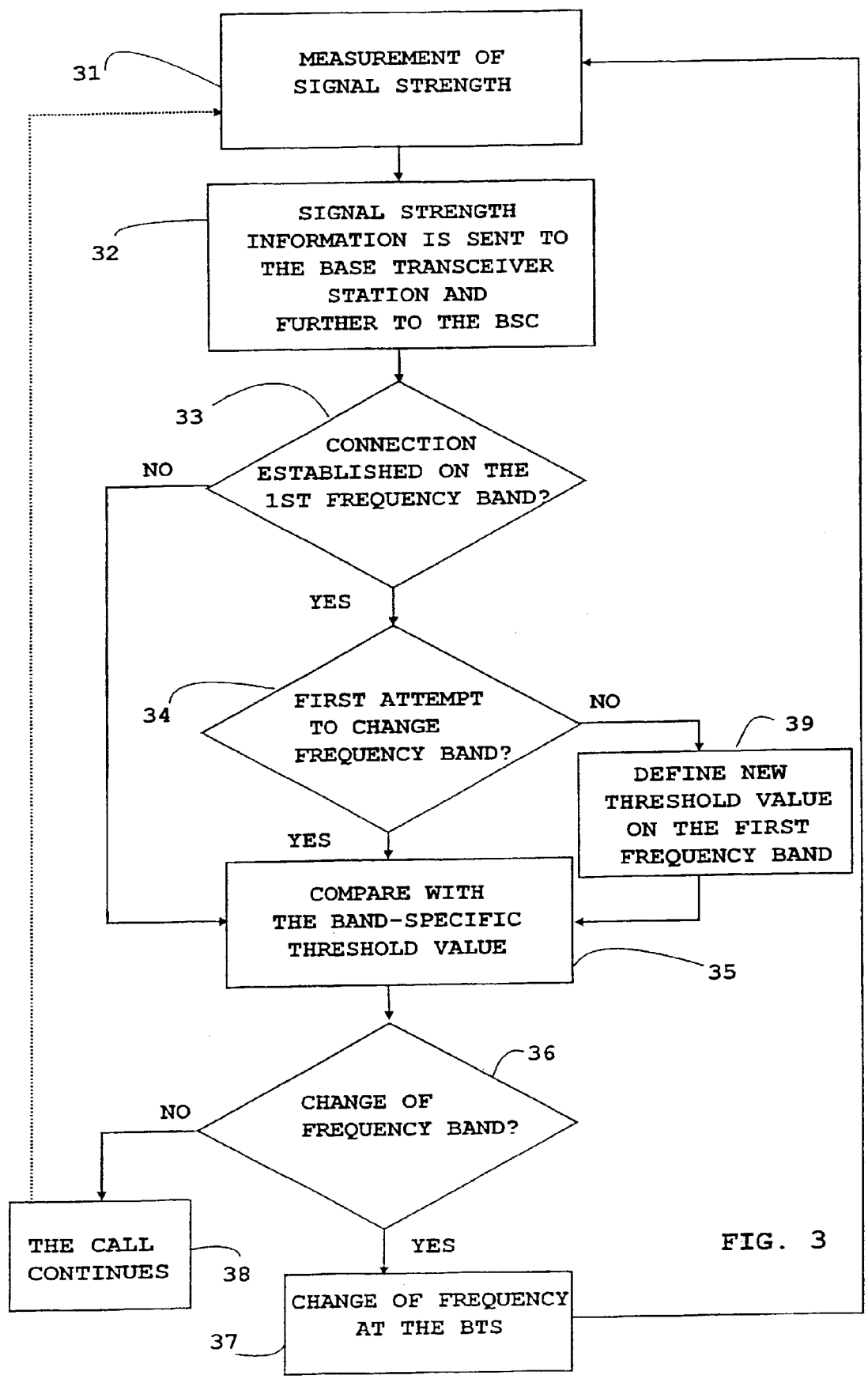
FIG. 3 illustrates a method according to the invention.

Let us study, by way of an example illustrated in FIGS. 2 and 3, the change of frequency band in a system that only has a BCCH on the GSM frequency band. The mobile station MS, using the GSM frequency band for transmitting the call, enters the coverage area of base transceiver station BTS1. The mobile station measures the strength of the signal received from the base transceiver station (step 31) and sends that information to the base transceiver station, which forwards it to the base station controller BSC (step 32). The base station controller checks which frequency range is being used to transmit the call (step 33). If the transmission is on the GSM band (first frequency band), the base station controller checks if this is the first attempt to change from the GSM band to the DCS band (step 34). If it is the first attempt, the base station controller uses the fixed signal strength threshold value that the operator has set for the GSM network (step 35) as the basis for making a decision regarding a change of frequency (step 36). (The fixed signal strength threshold value used by the operator may for instance be one that follows long-term averages and may, therefore, change from time to time.) When the signal level is equal to or higher than the threshold value, the base transceiver station changes, following the instruction from the base station controller, from the frequency used by the mobile station to the DCS frequency band (step 37). If the signal level is below the threshold value, the call is continued on the same frequency (step 38). The dashed line symbolises the fact that the system is constantly monitoring the signal strength on the frequency band used for the call.

After the change, the mobile station measures the signal level on the DCS frequency band (step 31) and sends that information to the network (step 32). Since the transmission is not now on the GSM band (the first frequency band), we move directly from step 33 to step 35 in FIG. 3. If the signal strength is sufficient, the call is continued on the DCS band (steps 36 and 38). However, if the signal strength is insufficient, the fixed part of the network switches the call back to the GSM band (steps 36 and 37).

The fixed network makes a further attempt to change the frequency band if the signal strength on the GSM frequency band is still at least at the level of the fixed threshold value. Since the transmission is now on the GSM band (the first frequency band), and the attempt to change is a repeat attempt, we move through steps 33 and 34 to step 39 in FIG. 3 where, as a result of the failed attempt to change, a new threshold value is determined, according to the invention, to replace the fixed threshold value. The new threshold value has been obtained on the basis of the signal level measurements of both frequency bands, applying for instance the following formula:

GSM.ob.new = DCS.tar + GSM.ob − DCSob
where
GSM.ob.new = the new signal level threshold value on the GSM frequency band, expressed in dBm,
DCS.tar = the target signal level threshold value on the DCS frequency band, expressed in dBm,
GSM.ob = the measured signal level threshold value on the GSM frequency band, expressed in dBm, before the change of frequency band,
DCSob = the measured signal level threshold value on the DCS frequency band, expressed in dBm, after the change of frequency band.

Due to the new threshold value, steps 35 and 36 will after this result in changing the frequency band in cases where such a change is more likely to be successful.

Figure 1:
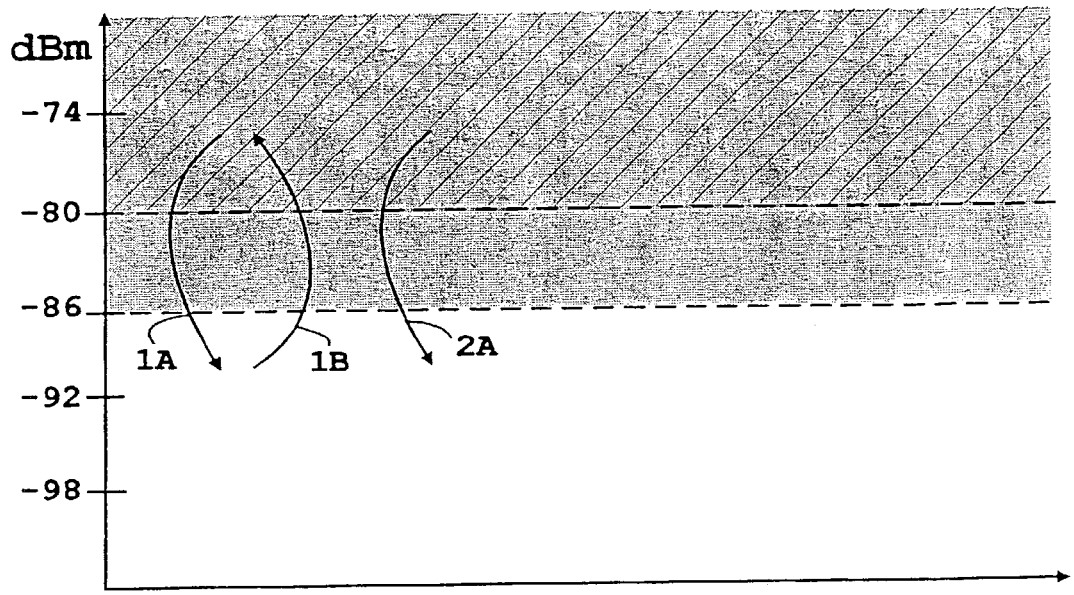
FIG. 1 illustrates prior art threshold values for changing frequency bands.
Figure 4:
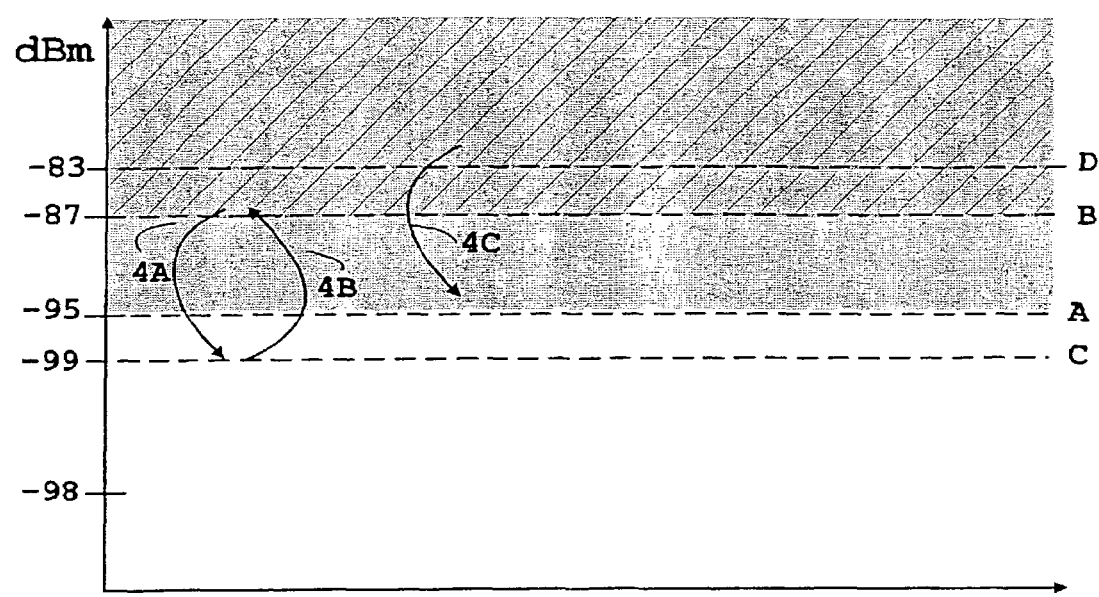
FIG. 4 illustrates threshold values, according to the invention, for changing frequency bands.

Let us study the example in FIG. 4 where the signal level areas have been marked in the same way as in FIG. 1. Let us assume that the operator is using 8 dB as the signal level difference between GSM and DCS, and that the target signal level on the DCS frequency band (DCS.tar) is at least −95 dBm (level A). Then, the GSM frequency band threshold value (GSM.ob) is −87 dBm (level B). If, however, the level of the DCS signal (DCSob) is, after the change of frequency (4A), for instance −99 dBm (level C), the call will be transferred back to the GSM frequency band (4B), after which a new threshold value GSM.ob.new is calculated. The new threshold value becomes: −95 dBm−87 dBm+99 dBm=−83 dBm (level D). Hence, a new attempt (4C) will only be made if the level of the GSM signal is −83 dBm or better.

The above example shows that since the signal level after the change was 4 dBm lower than the target post-change minimum value (−95 dBm), the GSM band threshold value will increase by 4 dBm, yielding a new value of −83 dBm. The new threshold value need not necessarily be a result of the above formula; it can be a result of rounding to the nearest practicable value, depending on the measuring systems and their accuracy. Alternatively, it is possible to use a table that gives the new threshold value on the basis of measured values (GSM.ob, DCSob). The threshold values in the table can follow the above formula with the desired level of accuracy.

The method, according to the invention, yields a frequency band change threshold value that is optimal for the subject mobile station under the subject conditions. The new threshold value will, therefore, create realistic chances of success for a fresh attempt to change the band. If even the new attempt fails, the threshold value calculation can be repeated as illustrated in FIG. 3. Since the coverage of the GSM network is better than that of the DCS network, there is no point in trying to change the frequency if the signal quality on the GSM band is not sufficient for maintaining the connection. Changing from GSM to DCS is sensible only when the signal level is good and there is a need to preserve the GSM network capacity.

Even though the invention has been described here in relation to a dual-band mobile station system, it is obvious that it can also be utilised, within the scope of the idea behind the invention, in other radio systems, such as radio systems with two frequency bands. Determining the new threshold value need not be based on measurements on both frequency bands; for example, empirically collected statistical information may be used for determining it.

The invention claimed is:

1. A method, comprising:
measuring strength of a signal received by a mobile station on a first frequency band,
sending information concerning a measured signal strength to a fixed network,
comparing the measured signal strength on the first frequency band with a predetermined threshold value of the first frequency band, and changing the first frequency band to a second frequency band when necessary,
as a result of the change, measuring strength of a signal received by the mobile station on the second frequency band,
sending information concerning a measured signal strength of the signal received by the mobile station on the second frequency band to the fixed network,
comparing signal strength measured on the second frequency band with a predetermined threshold value of the second frequency band, and changing the second frequency band back to the first frequency band, when insufficient,
wherein, as a result of the above change back to the first frequency band, the threshold value of the first frequency band is changed, and the changed threshold value is then used for comparison with measured signal strength of the first frequency band.

2. A method according to claim 1, wherein the threshold value of the first frequency band is changed based on measurements on the first frequency band and the second frequency band.

3. A method according to claim 2, wherein the changed threshold value is obtained by a formula

| | |
|---|---|
| GSM.ob.new = | DCS.tar + GSM.ob − DCSob |
| where | |
| GSM.ob.new = | a new signal level threshold value on the first frequency band, expressed in dBm, |
| DCS.tar = | a target signal level threshold value on the second frequency band, expressed in dBm, |
| GSM.ob = | a measured signal level threshold value on the first frequency band, expressed in dBm, before the change of frequency band, |
| DCSob = | a measured signal level threshold value on the second frequency band, expressed in dBm, after the change of frequency band. |

4. A method according to claim 1, wherein the first frequency band is a 900-MHz band, and the second frequency band is a 1,800-MHz band.

5. A method according to claim 1, wherein the first frequency band is a 400-MHz band, and the second frequency band is a 1,800-MHz band.

6. A method according to claim 1, wherein a part of the fixed network making a decision on changing a frequency band is a base station controller.

7. A method according to claim 2, wherein the changed threshold value is obtained based on measured results from a table in which threshold values corresponding to measured results have been stored in advance.

8. A method according to claim 2, wherein the changed threshold value is obtained from a table, formed based on statistical information, in which threshold values corresponding to measured results have been stored in advance.

9. An arrangement for changing a frequency band used by a mobile station in a mobile station system including at least one mobile station and a fixed network, connected to each other via a radio link, which radio link uses at least two frequency bands for transmitting information between the mobile station and the fixed network, which fixed network includes comparison instruments for comparing signal strength of a frequency band currently in use with a predetermined threshold value, specific to each frequency band, and instruments, responsive to the comparison instruments, for changing the frequency band currently in use on the radio link between the mobile station and the fixed network, wherein the fixed network includes threshold value determining instruments for changing at least one band-specific threshold value.

10. An arrangement according to claim 9, wherein the threshold value determining instruments include the first checking instruments for checking the frequency band used.

11. An arrangement according to claim 9, wherein the threshold value determining instruments include second checking instruments for checking whether an attempt to change frequency was a first attempt made.

12. An arrangement according to claim 10, wherein the threshold value determining instruments include second checking instruments for checking whether an attempt to change frequency was a first attempt made.

13. An arrangement for changing a frequency band used by a mobile station in a mobile station system including at least one mobile station and a fixed network, connected to each other via a radio link, which radio link uses at least two frequency bands for transmitting information between the mobile station and the fixed network, which fixed network includes comparison means for comparing signal strength of a frequency band currently in use with a predetermined threshold value, specific to each frequency band, and means, responsive to the comparison instruments, for changing the frequency band currently in use on the radio link between the mobile station and the fixed network, wherein the fixed network includes threshold value determining means for changing at least one band-specific threshold value.

14. An arrangement according to claim 9, wherein the threshold value determining means include the first checking means for checking the frequency band used.

15. An arrangement according to claim 9, wherein the threshold value determining means include second checking means for checking whether an attempt to change frequency was a first attempt made.

16. An arrangement according to claim 10, wherein the threshold value determining means include second checking means for checking whether an attempt to change frequency was a first attempt made.

17. A method comprising
receiving by a mobile station a signal on a first frequency band,
measuring a strength of the signal received on the first frequency band, sending information concerning a measured signal strength to a network for decision, based on a predetermined threshold value of the first frequency band, if a second frequency band is to be used, receiving by the mobile station a signal on a second frequency band, measuring a strength of a signal received on the second frequency band, sending information concerning a measured signal strength of the signal received on the second frequency band to the network for decision, based on a predetermined threshold value of the second frequency band, if the frequency is to be changed back to the first frequency band, in response to a decision to change the frequency back to the first frequency band, returning to measuring the first frequency band, and sending information concerning a measured signal strength of the signal received on the first frequency band to the network for a decision based on a changed threshold value of the first frequency band.

18. A mobile station configured to measure a strength of a signal received on a first frequency band, send information concerning a measured signal strength to a network for decision, based on a predetermined threshold value of the first frequency band, if a second frequency band is to be used, measure a strength of a signal received on the second frequency band, send information concerning a measured signal strength of the signal received on the second frequency band to the network for decision, based on a predetermined threshold value of the second frequency band, if the frequency is to be changed back to the first frequency band, and wherein the mobile station is further configured to, if the frequency is changed back to the first frequency band, return to measuring the first frequency band and to send information concerning a measured signal strength of the signal received on the first frequency band to the network for decision based on a changed threshold value of the first frequency band.

19. A method, comprising receiving information concerning a signal strength of a signal on a first frequency band used for communication between a network and a mobile station, comparing the signal strength of the first frequency band with a predetermined threshold value of the first frequency band, and changing to a second frequency band if necessary, receiving information concerning a signal strength of the signal on the second frequency band, comparing the signal strength of the second frequency band with a predetermined threshold value of the second frequency band, and changing back to the first frequency band if necessary, and in response to decision to change back to the first frequency band, changing at least one of the predetermined threshold values.

20. A controller for changing a frequency band for communication between a network and a mobile station via a radio link, which radio link uses at least two frequency bands for transmitting information between the network and the mobile station, the controller comprising comparison instruments for comparing signal strength of a frequency band currently in use with a predetermined threshold value, specific to each frequency band, instruments, responsive to the comparison instruments, for changing the frequency band currently in use on the radio link between the mobile station and the network, and threshold value determining instruments for changing at least one band-specific threshold value.

21. A controller as claimed in claim 20, comprising a base station controller for a mobile communication network.

* * * * *